Jan. 7, 1947.  J. A. FORBES  2,413,818
TRACTOR-TRAILER BRAKE SYSTEM
Filed Feb. 21, 1944  2 Sheets-Sheet 1

FIG.I.

INVENTOR.
JOSEPH A. FORBES
BY
ATTORNEYS

Jan. 7, 1947.  J. A. FORBES  2,413,818
TRACTOR-TRAILER BRAKE SYSTEM
Filed Feb. 21, 1944  2 Sheets-Sheet 2

*INVENTOR.*
JOSEPH A. FORBES
BY
ATTORNEYS

Patented Jan. 7, 1947

2,413,818

UNITED STATES PATENT OFFICE 2,413,818

TRACTOR-TRAILER BRAKE SYSTEM

Joseph A. Forbes, Detroit, Mich., assignor to Kelsey-Hayes Wheel Company, Detroit, Mich., a corporation of Delaware Application February 21, 1944, Serial No. 523,275

5 Claims. (Cl. 188—3)

The invention relates to tractor-trailer brake systems and refers more particularly to brake systems in which the brake mechanisms of the tractor and trailer are applied by mediums separate or distinct from each other.

The invention has for one of its objects to provide an improved tractor-trailer brake system in which the medium for applying the trailer brake mechanism is under the control of the operator of the tractor.

The invention has for other objects to provide an improved tractor-trailer brake system in which the braking effort exerted by the trailer brake mechanism is proportional to the braking effort exerted by the tractor brake mechanism; and to provide an improved tractor-trailer brake system in which the force of the medium for applying the trailer brake mechanism is in balance with the force of the medium for applying the tractor brake mechanism.

The invention has for a further object to provide an improved device for controlling the medium for applying the trailer brake mechanism.

With these and other objects in view, the invention resides in the novel features of construction and combinations and arrangements of parts as more fully hereinafter set forth.

In the drawings—

Figure 1:
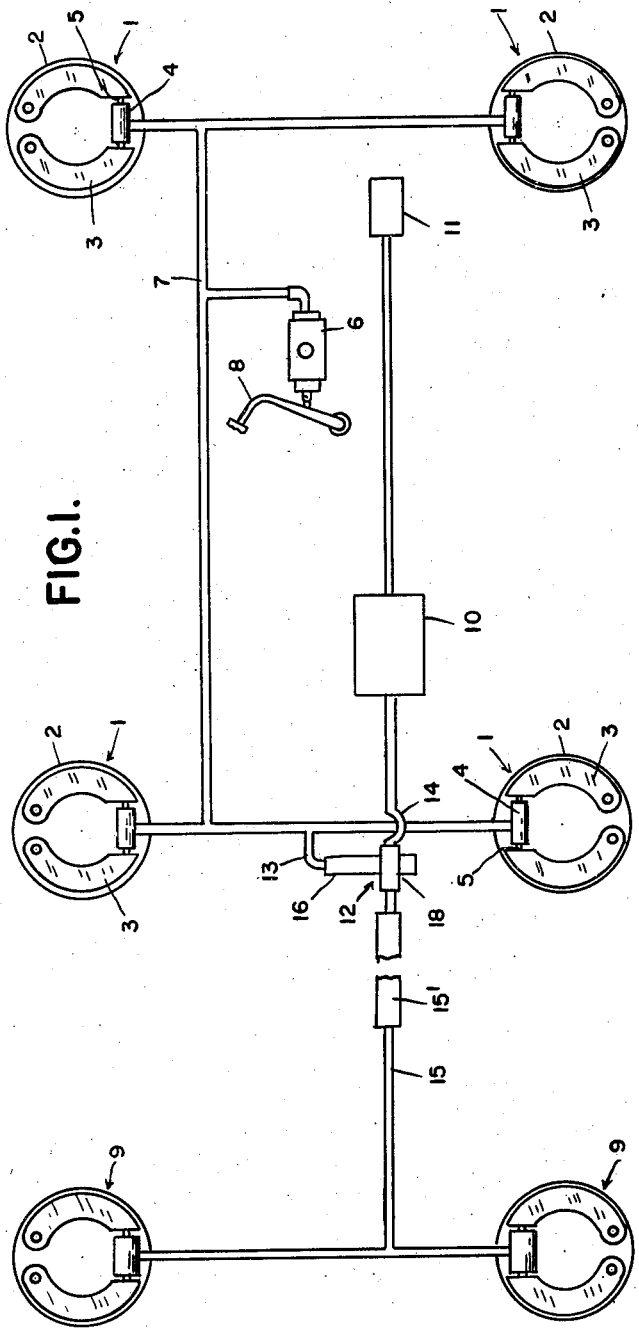
Figure 1 is a diagrammatic view of a tractor-trailer brake system embodying the invention.

The invention is particularly applicable to tractor-trailer brake systems in which the tractor is a commercial truck of conventional design equipped with a conventional brake mechanism comprising the brakes 1 which may be applied by different mediums, such as fluid, electricity, or mechanical linkage. In the present instance each brake is hydraulically applied and comprises the brake drum 2 mounted on and secured to a tractor wheel, the internal brake shoes 3 mounted on the backing plate, and the wheel cylinder 4 also mounted on the backing plate and having the piston rods 5 engageable with the separable ends of the brake shoes to separate the same to thereby force the brake shoes against the brake drum when the wheel cylinder is subjected to braking liquid under pressure. Each wheel cylinder is suitably connected to the master cylinder 6 by suitable tubing 7 forming the hydraulic line. The master cylinder is operable by the brake pedal 8. The wheel cylinders and the master cylinder are of conventional designs.

The trailer is also of conventional design and may be four-wheeled or two-wheeled and is adapted to be mechanically coupled to the tractor in any usual manner. The trailer is equipped with a conventional brake mechanism comprising the brakes 9 which, as shown, are constructed in the same manner as the brakes 1 of the tractor with the exception that the wheel cylinders are larger than the wheel cylinders of the tractor brakes. The braking fluid for operating the brakes 9 in the present instance is compressed air having a pressure lower than that created by the master cylinder in applying the tractor brakes. The compressed air is supplied by the tank 10 mounted on the tractor and preferably connected to the compressor 11 which is also mounted on the tractor.

To control the operation of the trailer brakes 9, I have provided the control device 12 which is mounted on the tractor. This control device is connected to the master cylinder 6 through the tubing 7 and the tube 13 and is also connected to the air tank 10 by the tube 14 and to the wheel cylinders of the trailer brakes by the tubing 15 forming the air line. The tubing 15 includes the flexible length 15′ permitting relative movement of the tractor and trailer.

Figure 2:
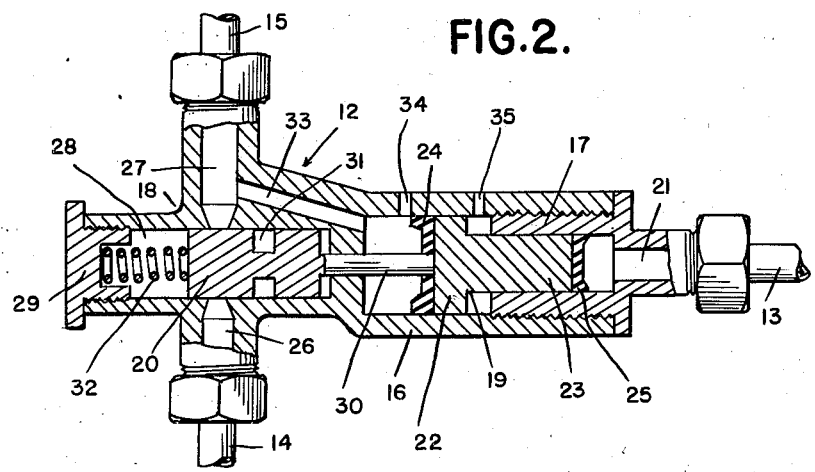
Figure 2 is a sectional view.

As illustrated in Figure 2, the control device comprises a housing member having the cylinder 16, the second cylinder 17 and the valve housing 18. The second cylinder 17 has an internal diameter smaller than that of the cylinder 16 and is fixedly secured in one end of the cylinder 16 preferably by being threaded thereinto. The control device also comprises the piston member 19 slidable within the cylinders 16 and 17 and the valve 20 slidable within the valve housing 18. The second cylinder 17 is provided with the inlet 21 which is connected to and communicates with the tube 13. The piston member 19 has the larger and smaller pistons 22 and 23 which are slidable in the cylinders 16 and 17, respectively, and are provided at their pressure ends with the sealing cups 24 and 25, respectively. In the present instance the pistons are integral. The valve housing 18 is provided at opposite sides with the transverse axially aligned inlet and outlet 26 and 27, respectively, the former being connected to and communicating with the tube 14 and the latter being connected to and communicating with the tubing 15. The valve housing is provided with the bore 28 in which the valve 20 is slidable and this bore is axially aligned with the cylinders 16 and 17 so that the valve is in axial alignment with the piston member 19. The bore 28 is closed by suitable means, such as the cap 29. The valve 20 is connected to the piston member 19 to move in unison therewith by means of the rod 30. The valve is provided with the annular groove 31 which is adapted to register with the inlet 26 and the outlet 27 to permit the flow of compressed air therethrough to the trailer brakes 9 when the valve is advanced by means of the piston member 19 under the pressure of the braking liquid in the hydraulic line of the tractor while the tractor brakes 1 are being applied. To resiliently hold the valve 20 in its normal position, at which time the annular groove of the valve is not in registration with the inlet and outlet of the valve housing, I have provided the coil spring 32 which is located within the bore 28 and abuts the cap 29 and the valve 20.

To make the braking effort exerted by the trailer brakes 9 proportional to the braking effort exerted by the tractor brakes 1 and to balance the force or the pressure of the compressed air for applying the trailer brakes with the force or the pressure of the braking liquid under pressure, the valve housing 18 is provided with the passageway 33 which leads from the outlet 27 to the cylinder 16 in advance of the larger piston 22 and the sealing cup 24. By reason of this passageway, the pressure of the compressed air in the outlet 27 and in the tubing 15 and the wheel cylinders of the trailer brakes, which is the same, is transmitted to the piston member 19 in opposition to the pressure of the braking liquid used in advancing the piston. As a result, a balance in pressures of the compressed air and braking liquid at the ends of the piston member is secured, it being apparent that as soon as the total pressure of the coil spring 32 and the compressed air on the larger piston 22 becomes greater than the total pressure of the braking liquid on the smaller piston 23, the valve 20 will be moved back or retracted by the piston member 19 to close communication between the inlet 26 and the outlet 27. The displacement of the braking liquid at this time causes a movement of the brake pedal against the operator's foot, but this movement is very small and hardly noticeable.

To provide for the escape of the compressed air from the wheel cylinders of the trailer brakes, the cylinder 16 is provided with the transverse port 34 which is open to the atmosphere and is located in advance of the sealing cup 24 when the piston member 19 is in its retracted or normal position. To provide for free flow of air in the space between the larger piston 22 and the second cylinder 17, the cylinder 16 is provided with the transverse port 35 which is also open to the atmosphere.

In operation when the operator desires to apply the tractor and trailer brakes, he presses down upon the brake pedal 8 and thereby operates the master cylinder 6 to force braking liquid under pressure through the hydraulic line 7 to the wheel cylinders 4 of the tractor brakes 1. At the same time the braking liquid under pressure is forced through the tube 13 and the inlet 21 to the second cylinder 17 to advance the piston member 19 and the valve 20. During the advance the annular groove 31 of the valve gradually comes into registration with the inlet port 26 and the outlet port 27 to allow compressed air to pass through the tube 15 to the wheel cylinders of the trailer brakes 9. At this time, the port 34 is closed so that compressed air in the outlet 27 reacts on the larger piston 22 in a direction opposite to that of the braking liquid on the smaller piston 23. As a result, a balance in total pressures may be secured. It is apparent that the greater the pressure of the braking liquid on the smaller piston 23 the greater the pressure of the compressed air on the larger piston 22 to secure balanced relation. Upon release of the brake pedal the parts are returned to their normal positions, at which time the port 34 is open so that the wheel cylinders of the trailer brakes are relieved from the air pressure.

Figure 3:
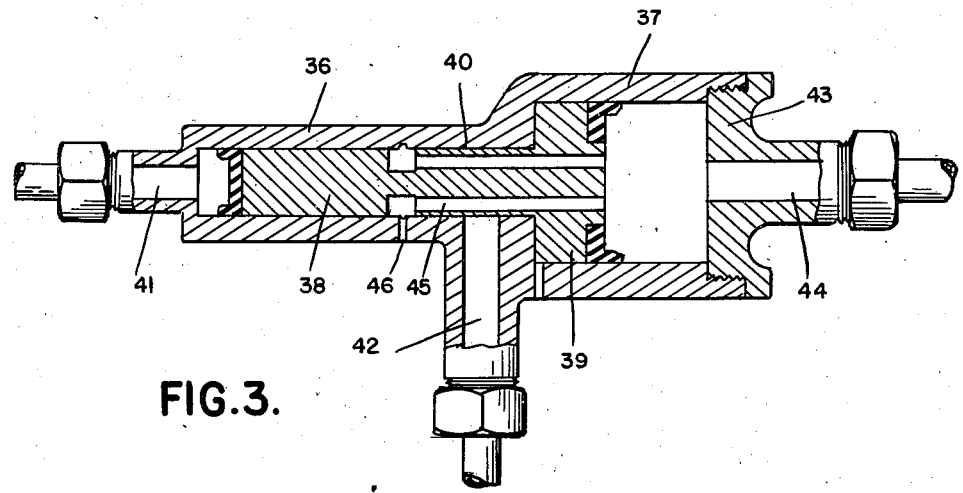
Figure 3 is a view similar to Figure 2 showing a modified construction.

Figure 3 illustrates a modified construction of control device having a housing member comprising the cylinder 36 and the second cylinder 37 of greater internal diameter than that of the cylinder 36. The control device also comprises a piston member comprising the smaller and larger pistons 38 and 39 slidable respectively in the cylinders 36 and 37, and the valve 40. The cylinders are in axial alignment as are also the pistons. The cylinder 36 has at one end the inlet 41 which is connected to the hydraulic line of the tractor and has at the other end the transverse air inlet 42 which is connected to the compressed air tank. The cylinder 37 is closed by the cap 43 which is provided with the air outlet 44 which is connected to the wheel cylinders of the trailer brakes. The valve 40 is in axial alignment with the pistons 38 and 39 and is located therebetween so that in the normal or off position of the piston member the valve closes the air inlet 42. The valve is provided with the longitudinally extending passageways 45 which extend through the larger piston 39 and open into the cylinder 37 in advance of the sealing cup for the larger piston. To provide for the escape of compressed air from the wheel cylinders of the trailer brakes, the cylinder 36 is provided with the transverse port 46 which is located in advance of the reduced piston portion 38 when in its normal or off position. This port is also located to clear the valve 40.

In operation, it will be seen that when the operator depresses the brake pedal of the tractor the tractor brakes will be applied and the braking liquid under pressure will advance the piston member comprising the smaller and larger pistons 38 and 39 and during the advance the valve 40 will gradually uncover the air inlet 42 to allow air to pass to the wheel cylinders of the trailer brakes, the port 46 being closed prior to the partial opening of the air inlet. The pressure of the air operating the wheel cylinders of the trailer brakes and of the air in the cylinder 37 is the same and this pressure is transmitted to the larger piston 39 in a direction opposite to that of the braking liquid on the smaller piston 38 with the result that the two pressures will become balanced in the same manner as in the device of Figure 3.

What I claim as my invention is:

1. A control device in a tractor-trailer brake system of the type wherein the tractor is equipped with a brake and a master cylinder for applying said brake and wherein the trailer is equipped with a brake operable by air under pressure, said device comprising a housing member having a cylinder connected to said master cylinder and a cylinder of larger diameter than and in substantially axial alignment with said second mentioned cylinder and connected to said trailer brake, a piston within said second mentioned cylinder operable by the fluid forced from said master cylinder, a second piston within said third mentioned cylinder directly subject to the pressure of air in said third mentioned cylinder and connected to said first mentioned piston to transmit the pressure of air to said first mentioned piston in opposition to the fluid pressure, and a valve connected to and movable in unison with said pistons for controlling the flow of air to said trailer brake and to said third mentioned cylinder.

2. A control device in a tractor-trailer brake system of the type wherein the tractor is equipped with a brake and a master cylinder for applying said brake and wherein the trailer is equipped with a brake operable by compressed air, said device comprising a housing member having a cylinder connected to said master cylinder and a cylinder of larger diameter than and in substantially axial alignment with said second mentioned cylinder and connected to said trailer brake, a piston within said second mentioned cylinder operable by the fluid forced from said master cylinder, a second piston within said third mentioned cylinder subject to the pressure of air in said third mentioned cylinder and connected to said first mentioned piston to transmit the pressure of air to said first mentioned piston in opposition to the fluid pressure, and a valve between and connected to said pistons for controlling the flow of air to said third mentioned cylinder, said valve and second piston having registering longitudinally extending passageways for air.

3. A control device in a tractor-trailer brake system of the type wherein the tractor is equipped with a brake, a master cylinder for directly applying said brake by fluid under pressure, and a manually operable member for operating said master cylinder and wherein the trailer is equipped with a brake operable by fluid under pressure separate from the first mentioned fluid, said device comprising a housing member having a fluid inlet communicating with said master cylinder, an inlet and an outlet for the second mentioned fluid, a piston member within said housing member operable by the fluid forced from said master cylinder through said fluid inlet, a valve connected to and movable in unison with said piston member and controlling the flow of the second mentioned fluid from said second mentioned inlet to said outlet to operate said trailer brake, and a passageway for transmitting the pressure of the second mentioned fluid in said outlet directly to said piston member in opposition to the pressure of the first mentioned fluid created by said master cylinder.

4. A control device in a tractor-trailer brake system of the type wherein the tractor is equipped with a brake and a master cylinder for applying said brake by fluid under pressure and wherein the trailer is equipped with a brake operable by fluid under pressure separate from the first mentioned fluid, said device comprising a housing member having a cylinder communicating with said master cylinder and another cylinder in substantially axial alignment with said second mentioned cylinder and connected to said trailer brake, a piston within said second mentioned cylinder operable by the fluid forced from said master cylinder, another piston within said third mentioned cylinder subject to the pressure of the second mentioned fluid in said third mentioned cylinder and connected to said first mentioned piston to transmit the pressure of the second mentioned fluid to said first mentioned piston in opposition to the pressure of the first mentioned fluid, and a valve connected to and movable in unison with said pistons for controlling the flow of the second mentioned fluid to said trailer brake and to said third mentioned cylinder.

5. A control device in a tractor-trailer brake system of the type wherein the tractor is equipped with a brake and a master cylinder for applying said brake by fluid under pressure and wherein the trailer is equipped with a brake operable by fluid under pressure separate from the first mentioned fluid, said device comprising a housing member having a cylinder communicating with said master cylinder and another cylinder in substantially axial alignment with said second mentioned cylinder and communicating with said trailer brake, a piston within said second mentioned cylinder operable by the first mentioned fluid, a second piston within said third mentioned cylinder subject to the pressure of the second mentioned fluid and connected to said first mentioned piston to transmit the pressure of the second mentioned fluid to said first mentioned piston in opposition to the pressure of the first mentioned fluid, and a valve between and connected to said pistons for controlling the flow of the second mentioned fluid to said third mentioned cylinder, said valve and second mentioned piston having registering longitudinally extending passageways for the second mentioned fluid.

JOSEPH A. FORBES.